United States Patent
Itoh

(10) Patent No.: US 11,636,576 B2
(45) Date of Patent: Apr. 25, 2023

(54) IMAGE PROCESSING APPARATUS FOR REDUCING INFLUENCE OF FINE PARTICLE IN AN IMAGE, CONTROL METHOD OF SAME, AND NON-TRANSITORY COMPUTER-READABLE STORAGE MEDIUM

(71) Applicant: CANON KABUSHIKI KAISHA, Tokyo (JP)

(72) Inventor: Yasuhiro Itoh, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 207 days.

(21) Appl. No.: 16/852,883

(22) Filed: Apr. 20, 2020

(65) Prior Publication Data
US 2020/0342575 A1 Oct. 29, 2020

(30) Foreign Application Priority Data
Apr. 25, 2019 (JP) .............................. JP2019-084427

(51) Int. Cl.
*G06T 5/00* (2006.01)
*G06T 7/11* (2017.01)

(52) U.S. Cl.
CPC ............. *G06T 5/003* (2013.01); *G06T 7/11* (2017.01); *G06T 2207/20204* (2013.01); *G06T 2207/30232* (2013.01)

(58) Field of Classification Search
CPC . G06T 5/003; G06T 7/11; G06T 2207/20204; G06T 2207/30232
See application file for complete search history.

(56) References Cited

U.S. PATENT DOCUMENTS

| 6,411,305 B1* | 6/2002 | Chui | .......... G06T 3/40 345/671 |
| 7,295,319 B2 | 11/2007 | Kajii | |

(Continued)

FOREIGN PATENT DOCUMENTS

| CN | 103201615 A | 7/2013 |
| CN | 104272347 A | 1/2015 |

(Continued)

OTHER PUBLICATIONS

Wang et al. ("A Novel Dehazing Method for Color Fidelity and Contrast Enhancement on Mobile Devices," IEEE Transactions on Consumer Electronics, vol. 65, Issue: 1, Feb. 2019; Date of Publication: Dec. 3, 2018) (Year: 2018).*

(Continued)

*Primary Examiner* — Yubin Hung
(74) *Attorney, Agent, or Firm* — Rossi, Kimms & McDowell LLP

(57) ABSTRACT

This disclosure provides an image processing apparatus comprising a first setting unit which sets a first parameter for processing for removing an influence of a fine particle component based on image data; a first image processing unit which performs fine particle removal processing based on the first parameter; a second setting unit which sets a second parameter; a second image processing unit which performs fine particle removal processing based on the second parameter; a setting unit which sets a region for which the first image processing unit is to be used and a region tor which the second image processing unit is to be used and a generation unit which generates image data by applying a result from the first image processing unit and a result from the second image processing unit to the respective set regions.

15 Claims, 11 Drawing Sheets

(56) References Cited

U.S. PATENT DOCUMENTS

| | | | |
|---|---|---|---|
| 7,724,980 B1* | 5/2010 | Shenzhi | G06T 5/20 348/625 |
| 9,300,883 B2 | 3/2016 | Nakamura | |
| 9,336,577 B2 | 5/2016 | Park | |
| 9,784,659 B2 | 10/2017 | Tanase | |
| 2011/0188775 A1 | 8/2011 | Sun | |
| 2014/0079288 A1* | 3/2014 | Lee | G06T 5/002 382/106 |
| 2014/0355903 A1 | 12/2014 | Sawada | |
| 2015/0063719 A1* | 3/2015 | Park | G06T 5/008 382/274 |
| 2015/0146980 A1* | 5/2015 | Itoh | G06T 5/003 382/167 |
| 2016/0071253 A1 | 3/2016 | Li et al. | |
| 2016/0171664 A1 | 6/2016 | Komiya | |
| 2016/0217346 A1* | 7/2016 | Puetter | G06V 10/10 |
| 2016/0328832 A1 | 11/2016 | Jeon | |
| 2017/0091912 A1 | 3/2017 | Nakamae | |
| 2017/0206690 A1* | 7/2017 | Itoh | G06T 5/002 |
| 2018/0122049 A1* | 5/2018 | Tsang | G06T 5/10 |
| 2018/0160039 A1 | 6/2018 | Hirayama | |

FOREIGN PATENT DOCUMENTS

| | | |
|---|---|---|
| CN | 104755906 A | 7/2015 |
| CN | 106462953 A | 2/2017 |
| CN | 108174113 A | 6/2018 |
| JP | 2003139707 A | 5/2003 |
| JP | 2016173777 A | 9/2016 |
| JP | 2018025878 A | 2/2018 |

OTHER PUBLICATIONS

Fattal ("Single Image Dehazing," SIGGRAPH, ACM Transactions on Graphics, 2008) (Year: 2008).*

Narasimhan et al. ("Contrast Restoration of Weather Degraded Images," IEEE Trans. on Pattern Analysis and Machine Intelligence, vol. 25, No. 6, Jun. 2003) (Year: 2003).*

He et al. ("Single Image Haze Removal Using Dark Channel Prior," IEEE Trans. on Pattern Analysis and Machine Intelligence, vol. 33, No. 12, Dec. 2011) (Year: 2011).*

Office Action issued in Chinese Appln. No. 202010329292.9 dated Dec. 16, 2021. English machine translation provided.

He "Guided Image Filtering" ECCV 2010: pp. 1-14.

* cited by examiner

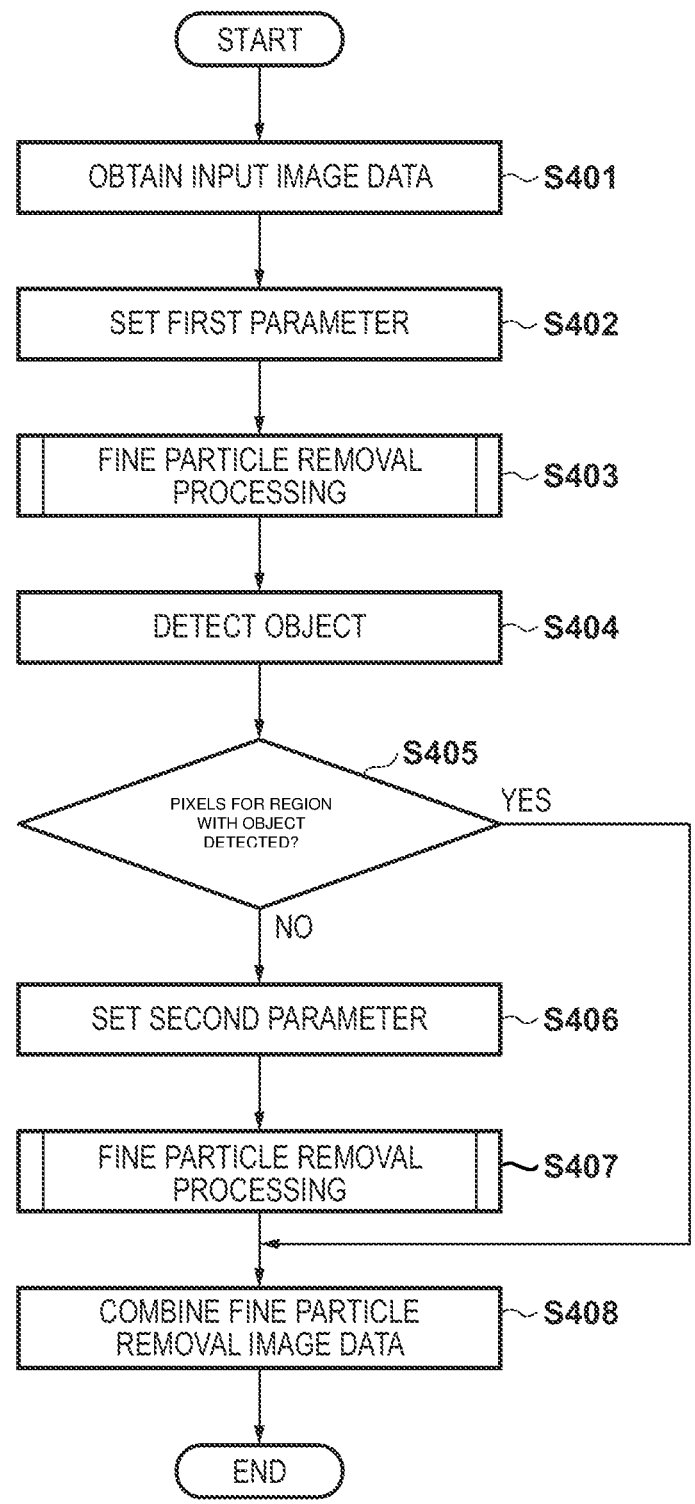

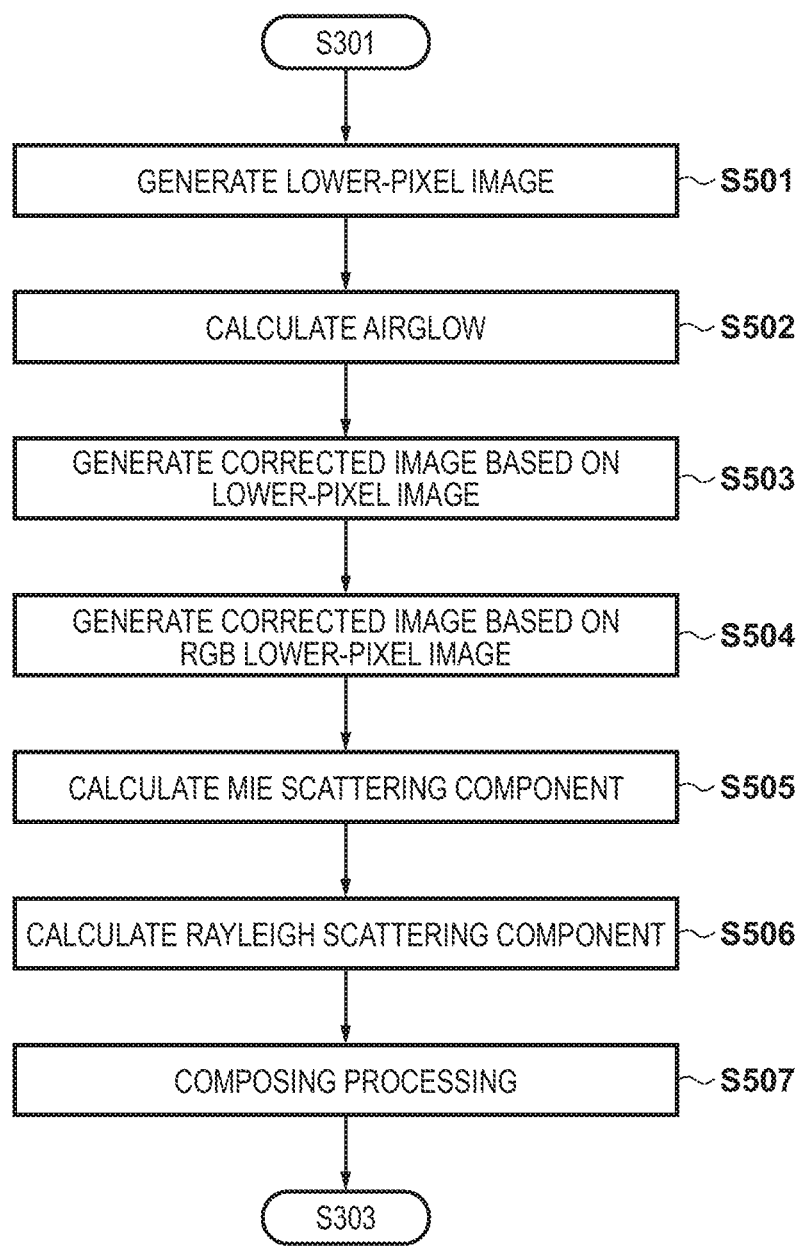

FIG. 6A

| | | | | |
|---|---|---|---|---|
| | P1 | P2 | P3 | |
| | P4 | P5 | P6 | |
| | P7 | P8 | P9 | |
| | | | | |

| | | | | |
|---|---|---|---|---|
| | | | | |
| | | T1 | | |
| | | | | |
| | | | | |

IMAGE PROCESSING APPARATUS FOR REDUCING INFLUENCE OF FINE PARTICLE IN AN IMAGE, CONTROL METHOD OF SAME, AND NON-TRANSITORY COMPUTER-READABLE STORAGE MEDIUM

BACKGROUND OF THE INVENTION

Field of the Invention

The present invention relates to an image processing apparatus, control method of same and non-transitory computer-readable storage medium.

Description of the Related Art

In the field of surveillance cameras, etc., the degradation of image quality of a captured image due to a decrease in visibility caused by a fine particle component (for example, fog) present between a camera and a photographic subject is a problem. US-2011-0188775 (referred to hereinafter as document 1) is proposed as a technique (fog/haze removal technique) for correcting an image having decreased visibility due to fog, etc. In document 1, visibility is improved by calculating, for each target pixel, the minimum value of the R, G, and B channels within a predetermined range around the target pixel, and correcting the contrast using the minimum value image. Furthermore, in US-2016-0328832 (referred to hereinafter as document 2), a histogram is calculated from an input image, and parameters for fog/haze removal processing are determined based on the likelihood and the kurtosis of the histogram.

In the technique disclosed in document 1, parameters used during image processing are uniquely held with respect to the entire image. However, there are cases in which it is better to vary parameters between a case in which the fog/haze removal technique is applied to a photographic subject at a relatively close distance and a case in which the fog/haze removal technique is applied to a photographic subject at a farther distance. Here, there is a possibility that, if processing is performed on a photographic subject at a close distance using parameters for a photographic subject at a farther distance, the image will be unnatural due to the effect of the processing being too strong for the photographic subject at a close distance.

Furthermore, in the technique disclosed in document 2, parameters are determined based on the histogram of an entire image. Due to this, even if a user would like to improve the visibility of a specific object (a person, for example) in an image, processing is executed so as to improve the visibility over the entire image, and the visibility of a person present at a position where fog is thick, in particular, is not improved. Furthermore, there is a possibility that, if an attempt is made to improve the visibility of a person present at a position where fog is thick, the image will be unnatural due to the fog/haze removal processing being excessively applied to a person whose visibility is already secured.

SUMMARY OF THE INVENTION

The present invention provides a technique for removing the influence of fog and haze in an image in accordance with the conditions of the shooting scene and an object whose visibility is desired to be improved.

According to a first aspect of the invention, there is provided an image processing apparatus that processes image data obtained by image capturing performed by an image-capturing unit, the image processing apparatus comprising: a first setting unit configured to set a first parameter for performing processing for removing an influence of a fine particle component based on the image data; a first image processing unit configured to perform fine particle removal processing based on the first parameter set by the first setting unit; a second setting unit configured to set a second parameter differing from the first parameter; a second image processing unit configured to perform fine particle removal processing based on the second parameter set by the second setting unit; a third setting unit configured to set a region for which the first image processing unit is to be used and a region for which the second image processing unit is to be used; and a generation unit configured to generate image data from which an influence of fine particles is removed by applying a result from the first image processing unit and a result from the second image processing unit to the respective regions set by the third setting unit.

According to a second aspect of the invention, there is provided a method of controlling an image processing apparatus that processes image data obtained by image capturing performed by an image-capturing unit, the method comprising: first setting step of setting a first parameter for performing processing for removing an influence of a fine particle component based on the image data; a first image processing step of performing fine particle removal processing based on the first parameter set in the first setting step; a second setting step of setting a second parameter differing from the first parameter; a second image processing step of performing fine particle removal processing based on the second parameter set in the second setting step; a third setting step of setting a region for which the first image processing step is to be used and a region for which the second image processing step is to be used; and a generation step of generating image data from which an influence of fine panicles is removed by applying a result from the first image processing unit and a result from the second image processing unit to the respective regions set by the setting unit.

According to a third aspect of the invention, there is provided a non-transitory computer-readable storage medium storing a program executable by a computer to execute a method of controlling an image processing apparatus that processes image data obtained by image capturing performed by an image-capturing unit, the method comprising: a first setting step of setting a first parameter for performing processing for removing an influence of a fine particle component based on the image data; a first image processing step of performing fine particle removal processing based on the first parameter set in the first setting step; a second setting step of setting a second parameter differing from the first parameter; a second image processing step of performing fine particle removal processing based on the second parameter set in the second setting step; a third setting step of setting a region for which the first image processing step is to be used and a region for which the second image processing step is to be used; and a generation step of generating linage data from which an influence of fine particles is removed by applying a result from the first image processing unit and a result from the second image processing unit to the respective regions set by the setting unit.

According to the present invention, the influence of fog and haze in an image is removed in accordance with the conditions of the shooting scene and an object whose visibility is desired to be improved.

Further features of the present invention will become apparent from the following description of an exemplary embodiment (with reference to the attached drawings).

BRIEF DESCRIPTION OF THE DRAWINGS

FIG. 4 is a flowchart illustrating processing in the image processing apparatus according to the embodiment.

FIG. 5 is a flowchart illustrating fine particle removal processing according to the embodiment.

FIGS. 6A and 6B are schematic diagrams illustrating the process of lower-pixel image generation according to the embodiment.

FIGS. 10A to 10D are schematic diagrams illustrating filter processing in RGB lower-pixel image generation processing according to the embodiment.

DESCRIPTION OF THE EMBODIMENT

Figure 1:
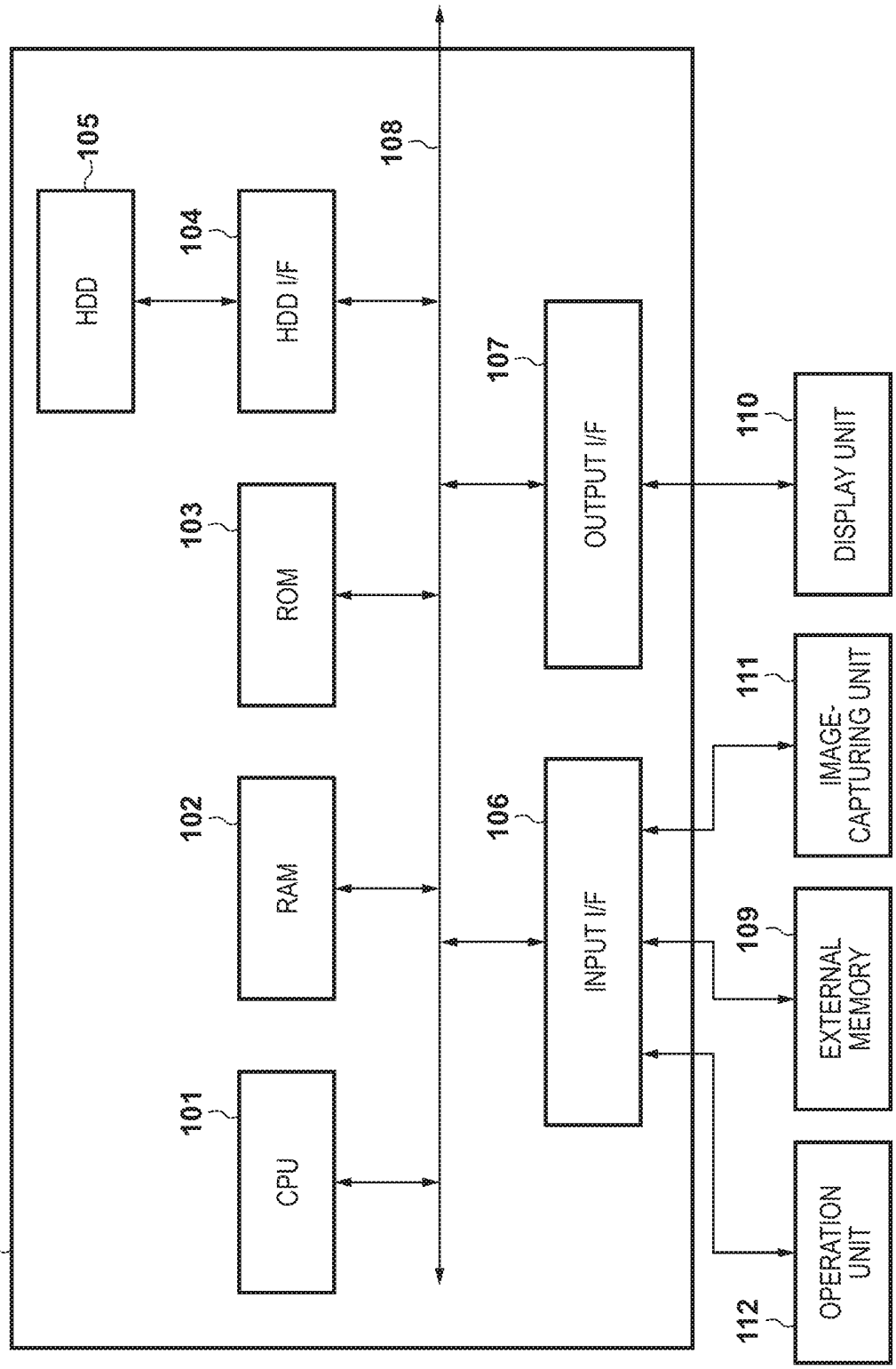
FIG. 1 is a block configuration diagram of an image processing apparatus in an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Overview

In the present embodiment, processing for removing the influence of a line particle component (referred to hereinafter as fine particles), such as fog, is first performed on an input image shot under conditions in which the fine particle component is generated. Next, an object such as a person is extracted from the image from which the influence of the fine particle component has been removed, by performing object detection processing such as person detection. By changing the ratio between the Mie scattering component and the Rayleigh scattering component in the input image based on this extraction result when generating a fine particle removal image, images in which the appearance of the influence of the fine particle component is varied are created. An image in which the object has higher visibility is obtained by combining these images.

Device Configuration According to Embodiment

FIG. 1 is a block configuration diagram of an image processing apparatus 100 to which the present embodiment applies. The image processing apparatus 100 according to the present embodiment includes a CPU 101, a RAM 102, a ROM 103, an HDD interface (I/F) 104, an HDD 105, an input I/F 106, an output I/F 107, and a system bus 108. The CPU 101 is a processor that performs overall control of the constituent units described below. The RAM 102 is a memory that functions as the main memory and work area of the CPU 101. The ROM 103 is a memory that stores various parameters and a program for controlling processing in the image processing apparatus 100.

The HDD I/F 104 is an interface conforming to the Serial ATA (SATA) standard, etc., for example, and connects the HDD 105, which serves as a secondary storage apparatus, to the system bus 108. The CPU 101 can read data from the HDD 105 and write data to the HDD 105 via the HDD I/F 104. Furthermore, the CPU 101 can load data stored in the HDD 105 into the RAM 102, and can similarly store data loaded in the RAM 102 to the HDD 105. Also, the CPU 101 can execute data loaded into the RAM 102, regarding the data as a program. Note that the secondary storage apparatus may be a storage device other than a HDD, such as an optical disk drive. The input I/F 106 is a serial bus interface conforming to the USB standard, the IEEE1394 standard, etc., for example.

The image processing apparatus 100 is connected to an external memory 109 and an image-capturing unit 111 via the input I/F 106. The CPU 101 can obtain captured image data from the external memory 109 and the image-capturing unit 111 via the input I/F 106. The output I/F 107 is a video output interface conforming to the DVI standard, the HDMI (registered trademark) standard, etc., for example. The image processing apparatus 100 is connected to a display unit 110 via the output I/F 107. The CPU 101 can display images on the display unit 110 by outputting the images to the display unit 110 via the output I/F 107.

The system bus 108 is a transfer path for various types of data, and the constituent units in the image processing apparatus 100 are connected to one another via the system bus 108.

The external memory 109 is a storage medium such as a hard disk, a memory card, a CF card, an SD card, or a USB memory, and can store data such as image data processed by the image processing apparatus 100.

The display unit 110 is a display apparatus such as a display, and can display images processed by the image processing apparatus 100, etc.

The image-capturing unit 111 is a camera that uses an image sensor to receive an optical image of a photographic subject and outputs the obtained optical image as digital image data. In the image processing apparatus 100 according to the present embodiment, image data whose contrast is decreased due to scattered light generated by fine particles, such as those of fog, is obtained by the image-capturing unit 111 through image capturing, and the image processing apparatus 100 generates an image in which the influence of fine panicles is reduced by performing image processing described below.

An operation unit 112 is constituted by one or more input devices such as a mouse and/or a keyboard, for example, and is used for specifying the later-described fog/haze removal range.

Figure 2:
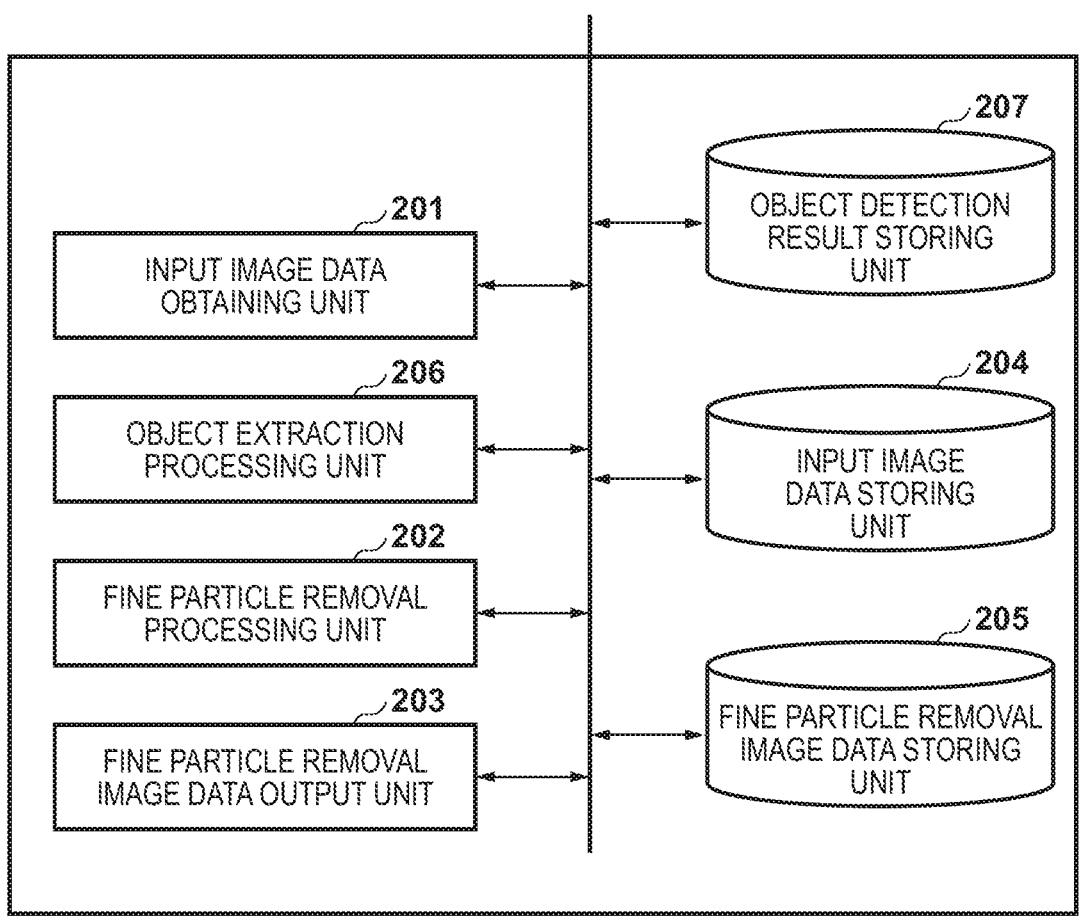
FIG. 2 is a functional block diagram of the image processing apparatus described in the embodiment.

FIG. 2 is a functional block diagram of the image processing apparatus described in the embodiment. As illustrated in FIG. 2, the image processing apparatus according to the embodiment includes an input image data obtaining unit 201, a fine particle removal processing unit 202, a fine particle removal image data output unit 203, an input image data storing unit 204, a fine particle removal image data storing unit 205, and an object extraction processing unit 206. The object extraction processing unit 206 is constituted by a known person detection technique, a known face detection technique, etc. The object extraction processing unit 206 performs detection of a shape of a person, a person's face, etc., on an input image, and stores an area corresponding to the shape of a person, a person's face, etc., in an object detection result storing unit 207 as a detection result. Note that, while the processing units illustrated in FIG. 2 are realized by the CPU 101 loading a program stored in the ROM 103 in the RAM 102 and executing the program, some of the processing units may be realized by means of hardware.

Figure 3:
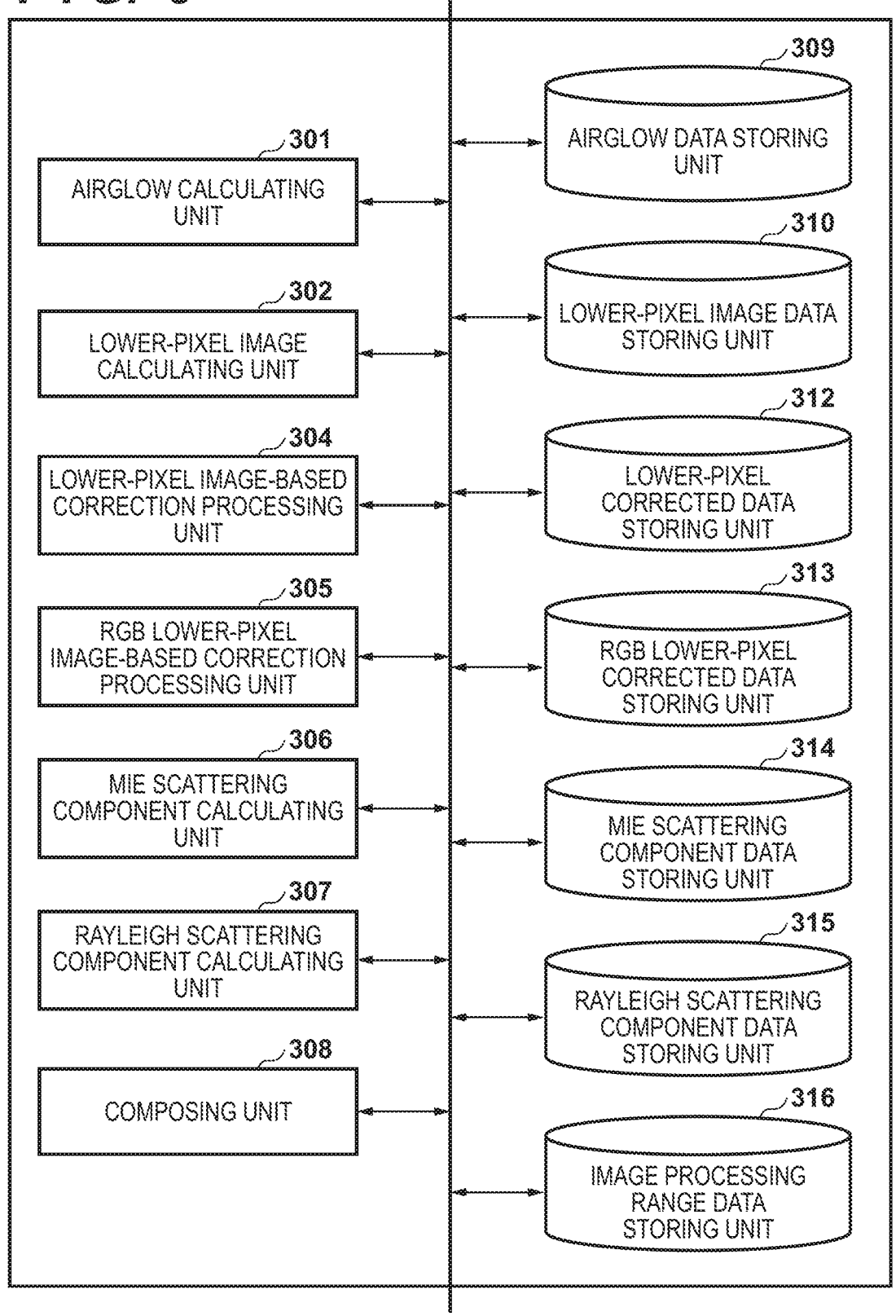
FIG. 3 is a diagram illustrating an internal configuration of a fine particle removal processing unit described in the embodiment.

FIG. 3 is a diagram illustrating an internal configuration of the fine particle removal processing unit 202 in the embodiment. The fine particle removal processing unit 202 includes an airglow calculating unit 301, a lower-pixel image calculating unit 302, a lower-pixel image-based correction processing unit 304 (hereinafter as correction processing unit 304), and an RGB lower-pixel image-based correction processing unit 305 (hereinafter as correction processing unit 305). The fine particle removal processing unit 202 also includes a Mie scattering component calculating unit 306 and a Rayleigh scattering component calculating unit 307 for controlling scattering components, and a composing unit 308. Furthermore, the fine particle removal processing unit 202 includes, as storage locations of data for these various types of processing, an airglow data storing unit 309, a lower-pixel image data storing unit 310, a lower-pixel corrected data storing unit 312, and an RGB lower-pixel corrected data storing unit 313. The fine panicle removal processing unit 202 includes a Mie scattering component data storing unit 314 and a Rayleigh scattering component data storing unit 315 for controlling scattering components. Furthermore, the fine particle removal processing unit 202 includes an image processing range data storing unit 316 that determines a processing range for fine particle removal processing.

While these constituent blocks are realized by the CPU 101 executing programs held in the ROM 103, the HDD 105, and the RAM 102, which serve as data holding areas, as necessary, some of the constituent blocks may be realized by means of hardware.

Overall Processing Flow

The flow of processing in the image processing apparatus 100 according to the embodiment will be described using the block diagram in FIG. 2 and the flowchart in FIG. 4.

In step S401, the CPU 101 controls the input image data obtaining unit 201 and causes the input image data obtaining unit 201 to obtain image data obtained through image capturing by the image-capturing unit 111, and stores the image data in the input image data storing unit 204.

In step S402, the CPU 101 sets a parameter for performing processing for removing a fine particle component on the input image data.

In step S403, the CPU 101 performs processing (described in detail later) for removing the influence of fine panicles, based on the parameter set in step S402.

In step S404, the CPU 101, by using known object detection processing, performs object detection on the image subjected to the fine particle removal processing in step S403. Here, the objects to be detected are objects whose visibility the user would like to improve. For example, if the user would like to improve the visibility of a person, the CPU 101 extracts a person in the image data by applying known person detection processing. The CPU 101 encloses, with a rectangle, the surrounding region of a person area resulting from the extraction, and stores the person area in the form of position information of the rectangle area in an object detection result storing unit 207. Note that, while an object detection result is a rectangle area in the present embodiment, the shape of the object detection result is not particularly limited, and the object detection result may have a shape other than a rectangular shape. Note that, in a case in which an object detection result is not a rectangle area, for example, it suffices to determine, for each pixel, whether the pixel is a pixel in which an object was detected.

In step S405, the CPU 101 compares the image subjected to the processing for removing the influence of fine particles and the object detection result, determines which region in the image data an object was detected in, and varies processing depending upon the result of the determination. Specifically, the CPU 101 shifts to the processing in step S408 for pixels corresponding to a region for which it has been determined that an object was detected in the image data, and shifts to the processing in step S406 for pixels corresponding to a region for which it has ben determined that no object was detected.

In step S406, the CPU 101 sets a parameter for the fine particle removal processing to be executed in the subsequent step S407 so that the object detection accuracy is further increased for the region in which no object was detected. Specifically, the parameter is set so that the fine particle removal effect is increased. For example, the parameter is set so that the later-described Mie Scattering intensity coefficient m and the later-described Rayleigh scattering intensity coefficient r are smaller in the parameter for the second iteration than in the parameter for the first iteration. For m in particular, setting m in the parameter for the second iteration to be smaller, setting m in the parameter for the second iteration to zero, etc., can be considered.

In step S407, the CPU 101 performs the fine particle removal processing once again based on the parameter set in step S406, which is for the second iteration of the fine particle removal processing. The image data that is processed here is not the image data subjected to the processing in step S403, and is the original input image data obtained in step S401.

Then, in step S408, the CPU 101 combines the image that is the result of the processing using the first parameter, for which it has been determined in step S405 that an object was detected, and the image that is the result of the processing using the second parameter performed in step S407. Specifically, one output image is generated using, for the detection region (pixels), which is the region for which it has been determined in step S405 that an object as detected, the image that is the result of the processing using the first parameter, and using, for the non-detection region, the image that is the result of the processing using the second parameter.

In such a manner, regions are set based on the object detection result, and for each of the regions, an image subjected to fine particle component removal processing having a different effect is generated.

Flow of Processing for Removing Influence of Fine Panicles

Here, the fine particle removal processing in steps S403 and S407 of FIG. 4 will be described in detail using the processing block diagrams in FIGS. 2 and 3 and the flowchart in FIG. 5. Note that step S403 and step S407 differ in that the parameter used for the processing differs.

In step S501, the lower-pixel image calculating unit 302 calculates a lower-pixel image (described in detail later) from the input image data stored in the input image data storing unit 204, and stores the lower-pixel image in the lower-pixel image data storing unit 310.

In step S502, the airglow calculating unit 301 calculates an airglow component (described in detail later) using the input image data stored in the input image data storing unit 204 and the lower-pixel image data stored in the lower-pixel image data storing unit 310. Then, the airglow calculating unit 301 stores the calculated airglow data in the airglow data storing unit 309.

In step S503, the lower-pixel image-based correction processing unit 304 reads the airglow data stored in the airglow data storing unit 309 and the lower-pixel image data stored in the lower-pixel image data storing unit 310. Furthermore, the correction processing unit 304 also reads image processing range data stored in the image processing range data storing unit 316. Then, the correction processing unit 304 performs correction (described in detail later) on the input image data stored in the input image data storing unit 204. The correction processing unit 304 stores the corrected image data in the lower-pixel corrected data storing unit 312.

In step S504, the RGB lower-pixel image-based correction processing unit 305 reads the airglow data stored in the airglow data storing unit 309, the input image stored in the input image data storing unit 204, and the image processing range data stored in the image processing range data storing unit 316. Then, this correction processing unit 305 performs correction (described in detail later) on the input image data. The correction processing unit 305 stores the corrected image data in the RGB lower-pixel corrected data storing unit 313.

In step S505, the Mie scattering component calculating unit 306 reads the input image data stored in the input image data storing unit 204 and the lower-pixel corrected image data stored in the lower-pixel corrected data storing unit 312. Then, the Mie scattering component calculating unit 306 calculates the Mie scattering component (described in detail later). The Mie scattering component calculating unit 306 stores the calculated Mie scattering component data in the Mie scattering component data storing unit 314.

In step S506, the Rayleigh scattering component calculating unit 307 reads the input image data stored in the input image data storing unit 204. Furthermore, the Rayleigh scattering component calculating unit 307 also reads the lower-pixel corrected image data stored in the lower-pixel corrected data storing unit 312 and the RGB lower-pixel-value corrected image data stored in the RGB lower-pixel corrected data storing unit 313. Then, the Rayleigh scattering component calculating unit 307 calculates the Rayleigh scattering component (described in detail later), and stores the calculated Rayleigh scattering component in the Rayleigh scattering component data storing unit 315.

In step S507, the composing unit 308 reads the RGB lower-pixel-value corrected image data stored in the RGB lower-pixel corrected data storing unit 313. Furthermore, the composing unit 308 reads the Mie scattering component data stored in the Mie scattering component data storing unit 314 and the Rayleigh scattering component data stored in the Rayleigh scattering component data storing unit 315. Subsequently, the composing unit 308 performs image composition (described in detail later), and stores the composed image data in the fine particle removal image data storing unit 205.

As a result of the processing described above, the fine particle removal processing in step S403 is completed.

Airglow Estimation

Next, the airglow calculation processing in step S502 will be described. The airglow calculating unit 301 first converts the input image from an RGB image into a luminance image (Y image). Next, the airglow calculating unit 301 generates a histogram from the Y image obtained as a result of the conversion, sets a value corresponding to the top 1% as a threshold, and performs robust estimation processing to determine pixels for estimating the airglow from among positions of pixels having pixel values greater than or equal to the threshold. Furthermore, the airglow calculating unit 301 estimates the airglow based on the pixel values of the determined pixels.

Figure 7:
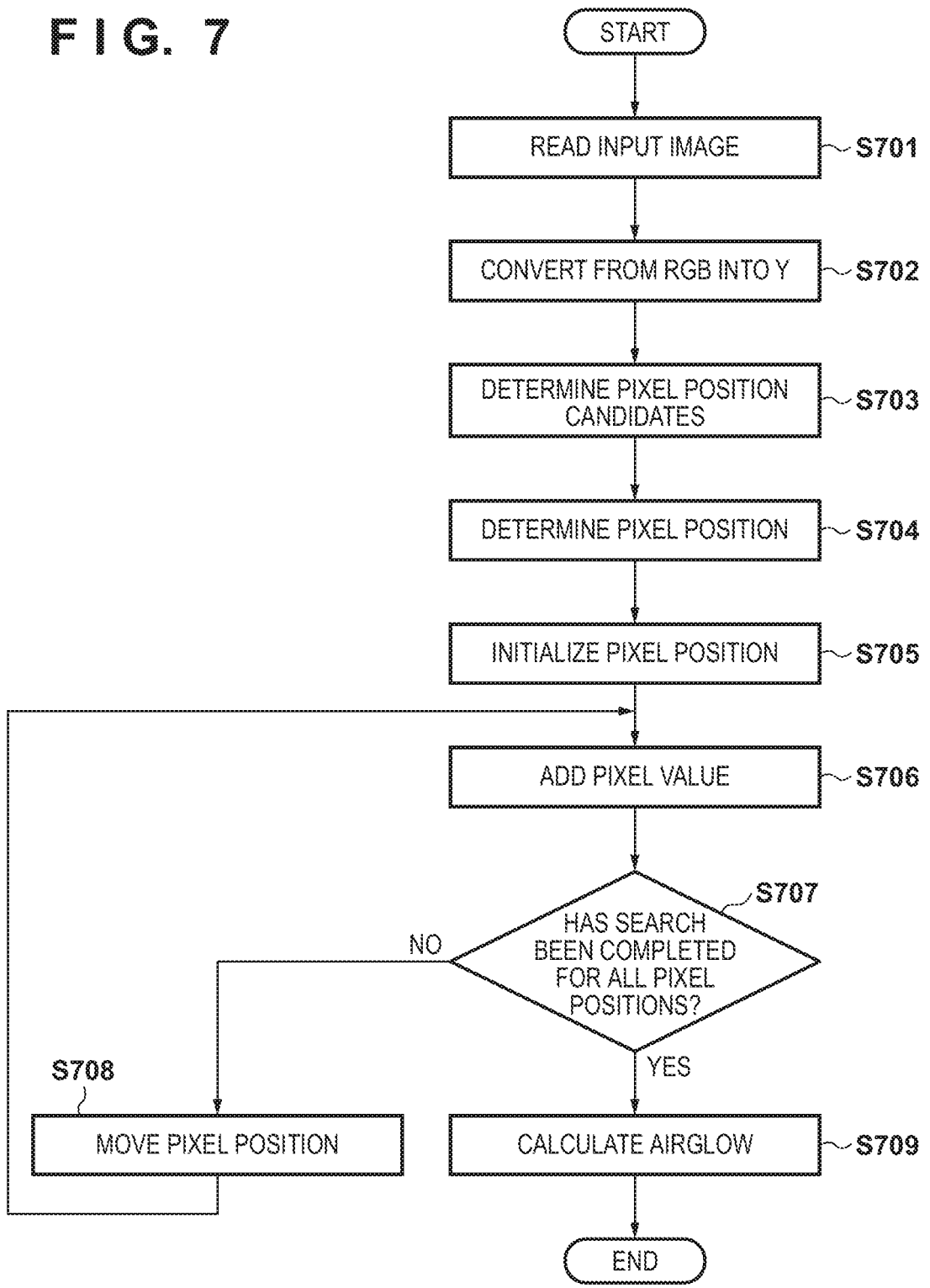
FIG. 7 is a flowchart illustrating airglow estimation processing according to the embodiment.

In the following, the details of the airglow calculating unit 301 in the embodiment will be described with reference to the flowchart in FIG. 7.

In step S701, the airglow calculating unit 301 reads the input image data from the input image data storing unit 204.

In step S702, the airglow calculating unit 301 converts the input image data read from an RGB image into a Y image. Here, a conventional formula for color conversion from RGB into Y may be applied as the conversion formula.

In step S703, the airglow calculating unit 301 from the Y image (luminance image) obtained through the conversion in step S702, generates candidates (referred to hereinafter as pixel position candidates) of airglow position information for performing airglow estimation. Specifically, the airglow calculating unit 301 calculates a histogram of the read Y image, sets a value corresponding to the top 1% from the maximum value as a threshold, and determines the positions of pixels having values greater than or equal to the threshold as reference pixel position candidates. Note that, while the top 1% is set as the threshold in the present embodiment, the embodiment is not limited to this, and a different percentage may be adopted.

In step S704 the airglow calculating unit 301 determines reference pixel position information (referred to hereinafter as pixel positions) for actually calculating the airglow. Specifically, based on the pixel position candidates determined in step S703, the airglow calculating unit 301 generates airglow position information using robust estimation such as the RANSAC method, based on the candidates. This is because pixel positions corresponding to the sky portion are naturally desirable as pixel positions to be selected as airglow, and the exclusion of high luminance portions other than the sky in the image from the pixel position candidates is desired. Generally, high luminance portions other than the sky occupy a small proportion in an image, and tend to have a luminance different from the color of the sky. Thus, robust estimation is performed in which high luminance portions other than the sky ran be treated as outliers and excluded. Furthermore, the number of pixel positions can also be limited in this process. This is for avoiding the following situation; in a case such as when there is a gradation in the color of the sky in an image, the same sky in the image includes different pixel values, and thus even a sky portion where the color changes would be subjected to estimation if too many pixels thereof are referred to.

In step S705, in order to calculate the airglow, the airglow calculating unit 301 determines the pixel position from which the airglow component is to be extracted first from among the pixel positions determined in step S704. In doing so, it suffices to determine the first pixel position in the raster scan order (for example, the top-left most pixel position) from among the pixel positions determined in step S704 as the pixel position from which the airglow component is to be extracted first.

In step S706, the airglow calculating unit 301 adds the pixel values (R, G, B) of the reference pixel position initially determined in step S705 or determined in step S708 color by color, and holds the results in the RAM 102, etc.

In step S707, the airglow calculating unit 301 determines whether or not the search has been performed for all pixel positions determined in step S704. The airglow calculating unit 301 advances the processing to step S709 if it is determined that the search has been performed for all pixel positions, and advances the processing to step S708 if it is determined that the search is not complete.

In step S708, the airglow calculating unit 301 moves the pixel position determined in step S704 to the next position. Specifically, among the pixel positions determined in step S704, the pixel position that is closest in the raster scan order to the pixel position that is currently being referred to is set.

In step S709, the airglow calculating unit 301 calculates the airglow component by averaging the added pixel values added and held in the RAM 102, etc., in step S706. Specifically, the airglow calculating unit 301 calculates the airglow component $A_{RGB}$ based on the formulas below.

$$A_{RGB} = (\Sigma A_R/n, \Sigma A_G/n, \Sigma A_B/n) \quad (1)$$

$$A_Y = (\Sigma A_R/n + \Sigma A_G/n + \Sigma A_B/n)/3 \quad (2)$$

Here, $A_R$, $A_G$, $A_B$, and $A_Y$ respectively indicate the airglow component values of the R channel, the G channel, the B channel, and the lower-pixel image. Furthermore, n indicates the total number of reference pixels determined in step S704, and $\Sigma$ indicates the sum of the values of the pixels determined in step S704. Note that formulas (1) and (2) given here are merely examples, and a different formula may be used as a calculation formula for the airglow estimation in the embodiment. For example, formula (2) may be replaced with the smallest value among $\Sigma A_R/n$, $\Sigma A_G/n$, and $\Sigma A_B/n$.

The airglow component can be estimated as described above. The airglow calculating unit 301 stores the estimated airglow component in the airglow data storing unit 309.

Creation of Lower-pixel Image

Next, the lower-pixel image generation processing performed by the lower-pixel image calculating unit 302 in step S501 will be described using FIGS. 6A and 6B. As illustrated in FIG. 6A, peripheral pixels centered around a given target pixel P5 in the input image are denoted as pixels P1 to P4 and pixels P6 to P9. Furthermore, the R, G, and B component values of the pixels P1 to P9 are expressed as P1(R1, G1, B1) to P9(R9, G9, B9).

Furthermore, suppose that these component values are ranked in the order of R5>B3>R2> . . . >R4>B1>G9>G7. Here, when a lower-pixel of the target pixel P5 is defined as T1 as illustrated in FIG. 6B, T1 is a weighted average of the three lower ranking component values excluding the lowest component value G7, as indicated in formula (3). By adopting a weighted average rather than the minimum value, a situation in which the lower-pixel image is highly influenced by sensor noise can be prevented. That is, a situation in which a pixel that is highly influenced by sensor noise is generated in the processed image can be suppressed compared to the case in which the minimum value is adopted.

$$T1 = (2 \times R4 + 4 \times B1 + 2 \times G9)/8 \quad (3)$$

The lower-pixel image calculating unit 302 generates the lower-pixel image by performing the above-described processing for all pixels. Furthermore, the lower-pixel image calculating unit 302 stores the generated lower-pixel image in the lower-pixel image data storing unit 310. Note that the calculation method mentioned above is an example of the calculation formula for calculating the lower-pixel image, and calculation need not be performed following execution of tins calculation formula. For example, calculation may be performed by averaging four lower ranking pixels from the second-to-lowest pixel. Furthermore, while a lower-pixel is generated by referring to peripheral pixels located at a distance of one pixel from the target pixel in the present embodiment, a lower-pixel may of course be calculated by referring to peripheral pixels located at a distance of two pixels, or reference may be made to peripheral pixels at a farther distance. It should be understood that FIGS. 6A and 6B are merely examples.

Generation of Corrected Image Based on Lower-pixel Image

Figure 8:
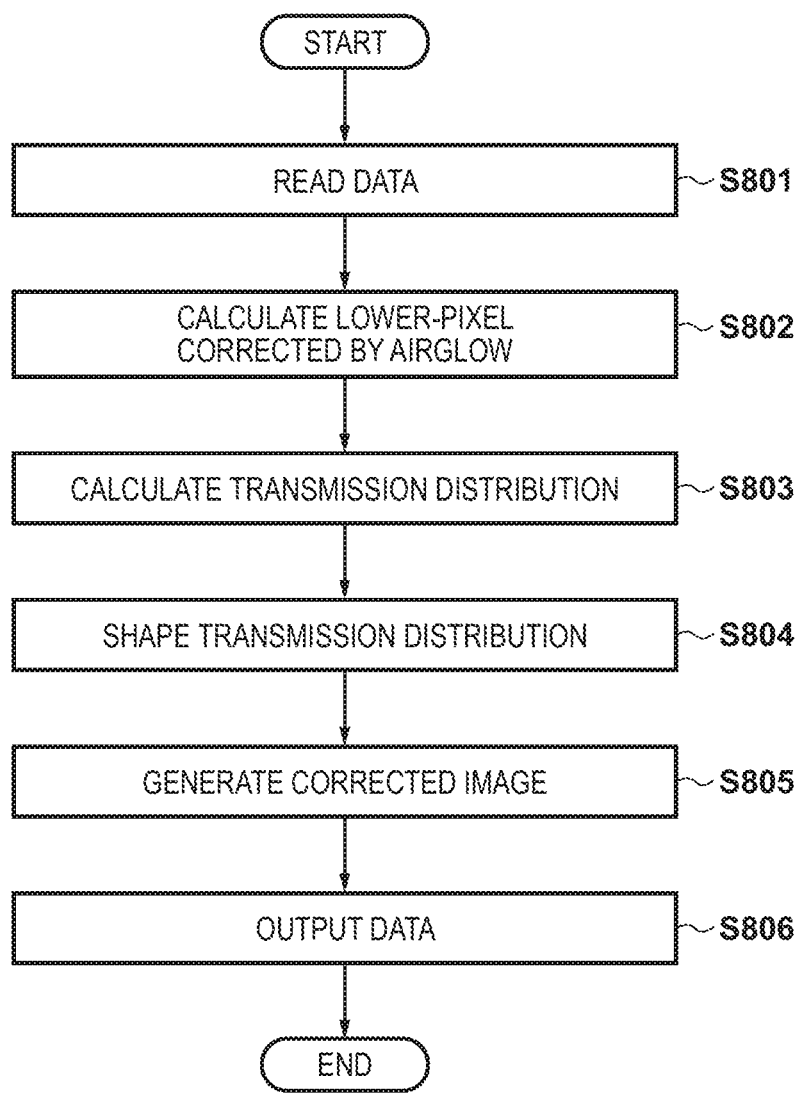
FIG. 8 is a flowchart illustrating lower-pixel corrected image generation processing according to the embodiment.

Next, the corrected image generation processing (step S503 in FIG. 5) based on the lower-pixel image, which is performed by the correction processing unit 304, will be described with reference to the flowchart in FIG. 8.

In step S801, the correction processing unit 304 reads the lower-pixel image, the airglow data, and the input image from the airglow data storing unit 309, the lower-pixel image data storing unit 310, and the input image data storing unit 204.

In step S802, the correction processing unit 304 calculates a corrected lower-pixel image lower_A by correcting the lower-pixel image using the airglow data. Specifically, the correction processing unit 304 corrects the lower-pixel image based on the airglow data, according to formula (4) below.

$$\text{lower\_A} = T_{in\_lower}/A_Y \quad (4)$$

Here, $T_{in\_lower}$ indicates the lower-pixel image generated in step S501.

In step S803, the correction processing unit 304 generates a transmission distribution $t_{lower}(x, y)$ based on the corrected lower-pixel image lower_A calculated in step S802. Specifically, the formula below is applied to lower_A(x, y) generated in step S802.

$$t_{lower} = 1.0 - \omega \times \text{lower\_A}(x,y) \quad (5)$$

Here, ω is a coefficient for adjustment, and is "0.9" for example. Furthermore, x and y are horizontal-direction and vertical-direction coordinates in the image. The coefficient ω is a value provided in order to prevent a value of a target pixel subjected to the fine particle removal processing from equaling zero due to transmission equaling zero in a case in which the transmission light of the pixel is consisted only of light scattered by fine particles, such as those of fog, and need not be "0.9" as mentioned above.

In step S804, the correction processing unit 304 shapes the transmission distribution generated in step S803 in accordance with the input image and the image processing range data, which is input from a UI. This shaping is performed because the transmission distribution $t_{lower}(x, y)$ needs to match the shapes of photographic subjects such as structures included in the image-captured data, and in order to limit the processing range to a transmission distribution range specified by means of the UI. In the processing up to step S803, the transmission distribution $t(x, y)$ only includes information regarding approximate photographic subject shapes in the image-captured data. Thus, the shaping is performed because photographic subject shapes need to be accurately separated. Specifically, it suffices to use a known edge-preserving filter as that disclosed in the document "Guided Image Filtering," Kaiming He, Jian Sun, and Xiaoou Tang, in ECCV 2010 (Oral).

Next, measures are taken so that the processing for removing the influence of line particles is not performed on pixel portions outside the transmission distribution range specified using the UI. For values exceeding t_th_max and values falling below t_th_min that have been specified by means of the UI, $t_{lower}(x, y)=1$ is substituted into the transmission distribution $t_{lower}(x, y)$.

Note that, while the values set by means of the UI are applied after the filter processing in the present embodiment, the values set by means of the UI first may of course be applied.

In step S805, the correction processing unit 304 calculates a corrected image that is based on the lower-pixel image from $A_Y$ and the transmission distribution $t_{lower}(x, y)$. Specifically, this is performed based on formula (6) below.

$$J_{lower}(x, y) = \frac{(I(x, y) - A_Y)}{\max(t_0, t_{lower}(x, y))} + A_Y \qquad (6)$$

Here, $J_{lower}$ is the corrected image based on the lower-pixel image, I is the input image, and $t_0$ is a coefficient for adjustment, and is "0.1" for example. Here, $t_0$ is a value provided in order to prevent a situation in which the value of $J_{lower}$ fluctuates significantly due to a slight difference from the input image I, such as shot noise during the image capturing, in a case in which $t_{lower}$ is an extremely small value, and need not be "0.1" as mentioned above. Further, max( . . . ) is a function that returns the maximum value of the group of numerical values lined up inside the brackets.

In step S806, the correction processing unit 304 stores the lower-pixel corrected image $J_{lower}$ calculated in step S805 in the lower-pixel corrected data storing unit 312.

By performing the above-described processing, an image which is based on the lower-pixel image and in which the influence of the fine particle component is corrected can be created.

Generation of Corrected Image Based on RGB Lower-Pixel-Value Image

Figure 9:
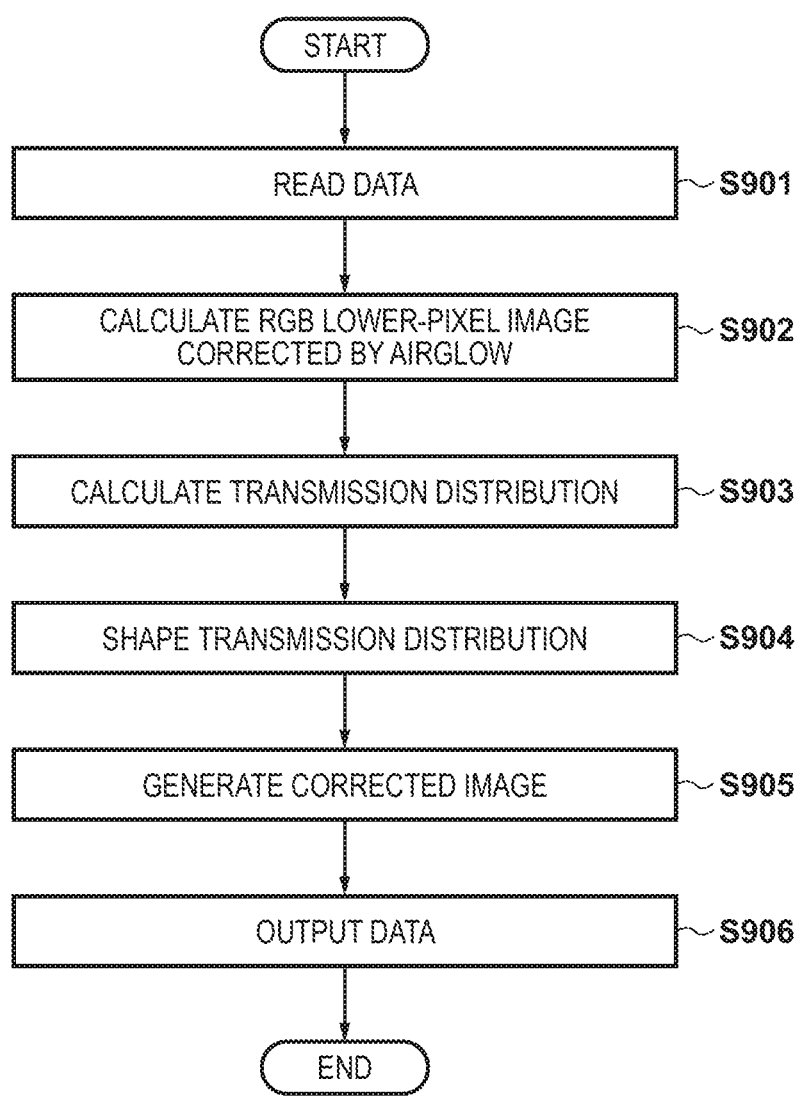
FIG. 9 is a flowchart illustrating processing for generating an RGB lower-pixel-value corrected image according to the embodiment.

Next, the corrected image generation processing (step S504 in FIG. 5) performed by the RGB lower-pixel image-based correction processing unit 305 will be described with reference to the flowchart of FIG. 9.

In step S901, the correction processing unit 305 reads the input image from the input image data storing unit 204, and reads the airglow data from the airglow data storing unit 309.

In step S902, the correction processing unit 305 calculates an RGB lower-pixel-value image patch_RGB_A corrected using the airglow, by performing correction (filter processing) on the input image for each of the planes R, G, and B using the airglow data.

First, the correction processing unit 305 calculates the RGB lower-pixel image patch_RGB_A corrected using the airglow by correcting an RGB lower-pixel-value image using the airglow data, according to formula (7) below.

$$RGB\_A(x,y,c) = T_{in\_RGB}(x,y,c)/A_{RGB} \qquad (7)$$

Here, $T_{in\_RGB}$ indicates the RGB lower-pixel-value image data before correction, and RGB_A indicates the corrected RGB lower-pixel-value image data. Further, x and y indicate horizontal-direction and vertical-direction coordinates in the image, and c indicates a color plane (which is either R, G, or B).

Next, the correction processing unit 305 calculates the RGB lower-pixel image patch_RGB_A corrected using the airglow by performing filter processing on the previously-calculated RGB_A. In the processing following step S903, patch_RGB_A is used for all calculations as the RGB lower-pixel image corrected using the airglow.

Here, details of the filler processing in the present processing will be described with reference to FIGS. 10A to 10D.

Figures 10A, 10B, 10C, 10D:
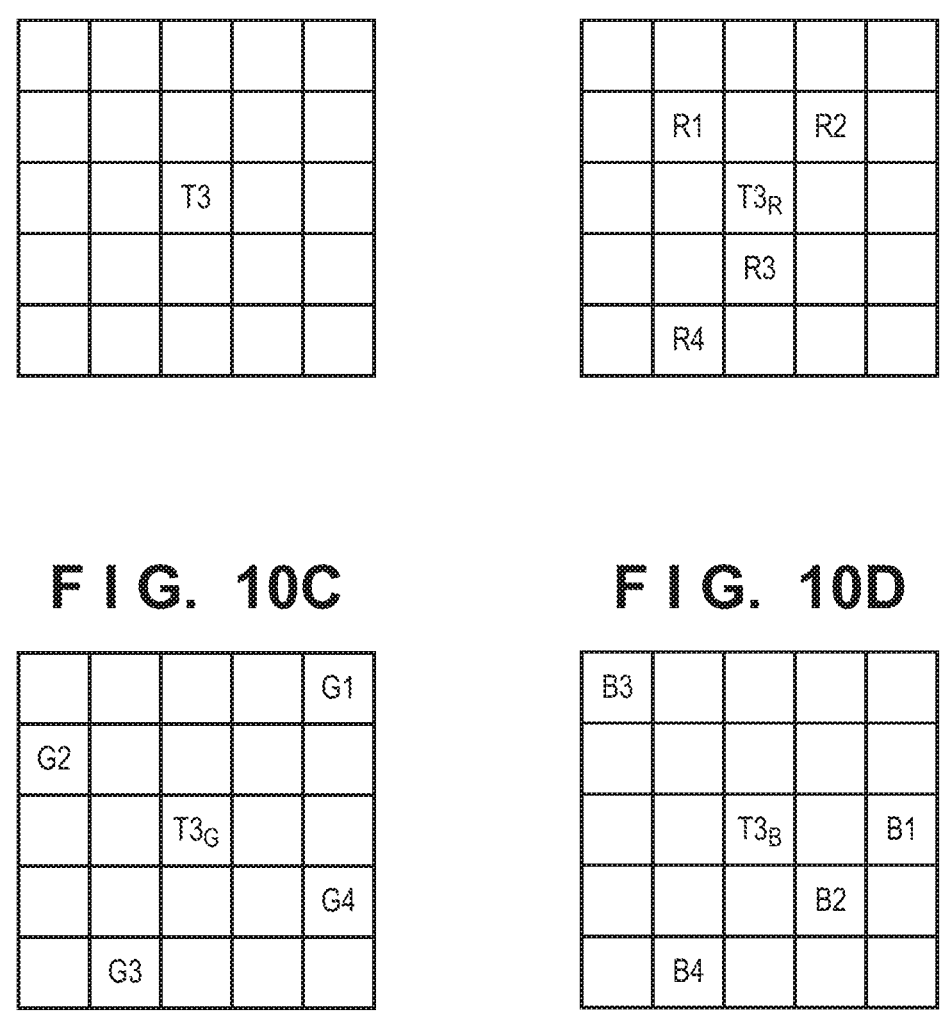

In FIGS. 10A to 10D, the process of performing filter processing on a given target pixel T3 is illustrated as schematic diagrams. FIG. 10A illustrates RGB_A. In FIGS. 10B to 10D, FIG. 10A is shown separated into the planes R, G, and B. T3 indicates the target pixel to be processed in the filtering, and $T3_R$, $T3_G$, and $T3_B$ respectively indicate the component value of the target pixel T3 in the planes R, G, and B. Furthermore, R1 to R4, G1 to G4, and B1 to B4 in FIGS. 10B to 10D indicate four values counted from the minimum value within a range of 5×5 pixels from the target pixel in the planes R, G, and B, respectively, and the pixel values are ranked R4>R3>R2>R1 in order of greater value. G1 to G4 for the G component and B1 to B4 for the B component have the same meanings.

In a case in which filter processing is performed on the corrected RGB lower-pixel-value image data RGB_A, the lower-pixels of the planes R, G, and B within the range of 5×5 pixels with the target pixel T3 at the center differ for each color, as illustrated in FIGS. 10B to 10D. Due to this, a lower-pixel filter processing result $T3_R$ for the R channel as illustrated in FIG. 10B is calculated according to formula (8) below.

$$T3_R = (2 \times R2 + 4 \times R3 + 2 \times R4)/8 \qquad (8)$$

Similarly, the result obtained by substituting G2, G3, and G4 into formula (8) above will be the result in a case in which the minimum value $T3_G$ for the G channel is calculated. This similarly applies to the minimum value $T3_B$ for the B channel as well. The difference from the lower-pixel image is that, for these values, pixel values of the same plane as the plane of the target pixel are adopted. The lower-pixel image differs from the RGB lower-pixel image, and calculation is performed using the pixels of all of the planes around the target pixel. Thus, pixels from any of the planes R, G, and B may be adopted, but in the case of the RGB lower-pixel-value, pixels are adopted from only the same plane. Due to this difference, the influence of wavelengths of scattered light can be taken into account.

Following this, the RGB lower-pixel-value image patch_RGB_A corrected using the airglow is calculated by applying this processing to all pixels of RGB_A.

In step S903, the correction processing unit 305 creates a transmission distribution $t_{RGB}(x, y, c)$ based on the RGB lower-pixel-value image corrected using the airglow, which was calculated in step S902. The following formula is applied to patch_RGB_A generated in step S902.

$$t_{RGB}=1.0-\omega \times \text{patch\_RGB\_A}(x,y,c) \quad (9)$$

Here, ω is a coefficient for adjustment, and is for example 0.9. ω is a value provided in order to prevent a value of a target pixel subjected to fine particle removal processing from equaling zero due to transmission equaling zero in a case in which the transmission light of the pixel is consisted only of light scattered by fine particles, such as those of fog, and need not be 0.9 as mentioned above.

In step S904, the correction processing unit 305 shapes the transmission distribution generated in step S903 in accordance with the input image, and ensures that processing is not performed on portions outside the transmission distribution range specified by means of the UI. The specific procedures are the same as those in step S804, but in the case of the RGB lower-pixel-value image, the processing in step S804 is performed for each color plane of the transmission distribution $t_{RGB}(x, y, c)$.

In step S905, the correction processing unit 305 calculates a corrected image based on the RGB lower-pixel-value image from the airglow $A_{RGB}$ and the transmission distribution $t_{RGB}(x, y, c)$. Specifically, this is performed based on formula (10) below.

$$J_{RGB}(x, y, c) = \frac{(I(x, y, c) - A_{RGB})}{\max(t_0, t_{RGB}(x, y, c))} + A_{RGB} \quad (10)$$

Here, $J_{RGB}$ is the corrected image based on the RGB lower-pixel-value image, and I is the input image. Furthermore, $t_0$ is a coefficient for adjustment, and is 0.1, for example. Here, $t_0$ is a value provided in order to prevent a situation in which the value of $J_{RGB}$ fluctuates significantly due to a slight difference from the input image I, such as shot noise during the image capturing, in a case in which $t_{RGB}$ is an extremely small value, and need not be 0.1 as mentioned above.

In step S906, the correction processing unit 305 stores $J_{RGB}$ calculated in step S905 in the RGB lower-pixel corrected data storage unit 313.

By performing the above-described processing, an image obtained by correcting the RGB lower-pixel-value image can be created.

Calculation of Mie Scattering Component

Figure 11:
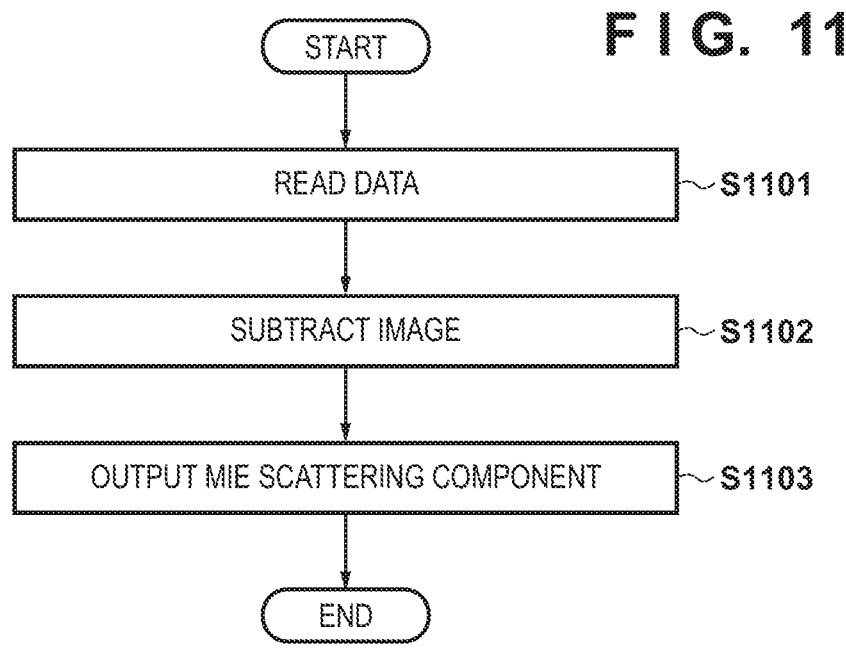
FIG. 11 is a flowchart illustrating Mie scattering component generation processing according to the embodiment.

Next, processing (step S505) for calculating a light scattering component deriving from Mie scattering from the lower-pixel corrected image data and the input image, which is performed by the Mie scattering component calculating unit 306, will be described with reference to the flowchart in FIG. 11.

In step S1101, the Mie scattering component calculating unit 306 reads the lower-pixel corrected data from the lower-pixel corrected data storing unit 312, and reads the input image from the input image data storing unit 204.

In step S1102, the Mie scattering component calculating unit 306 subtracts a pixel value for each pixel in the image to extract the Mie scattering component. Specifically, the Mie scattering component calculating unit 306 calculates a Mie scattering component image according to formula (11) below.

When $I(x,y,c)-J_{lower}(x,y,c) \geq 0$:

$$M(x,y,c)=I(x,y,c)-J_{lower}(x,y,c)$$

When $I(x,y,c)-J_{lower}(x,y,c)<0$:

$$M(x,y,c)=0 \quad (11)$$

Here, M(x, y, c) is the Mie scattering component image. The Mie scattering component can be extracted from the image by means of this calculation.

In step S1103, the Mie scattering component calculating unit 306 stores the Mie scattering component image calculated in step S1102 in the Mie scattering component data storing unit 314.

By performing processing as described above, the Mie scattering component in the image can be calculated.

Calculation of Rayleigh Scattering Component

Figure 12:
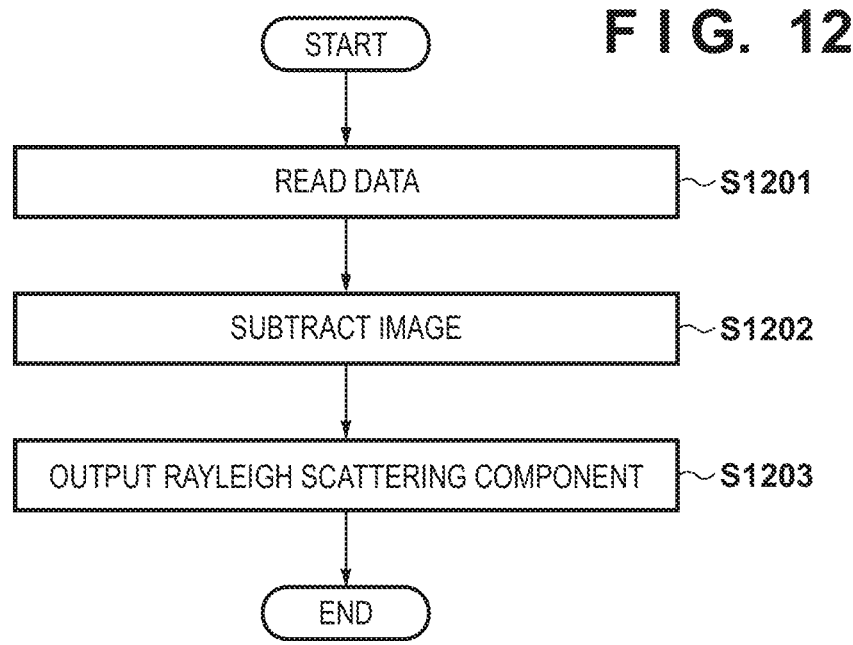
FIG. 12 is a flowchart illustrating Rayleigh scattering component generation processing according to the embodiment.

Next, processing (step S506) for calculating the Rayleigh scattering component, which is performed by the Rayleigh scattering component calculating unit 307, will be described with reference to the flowchart in FIG. 12.

In step S1201, the Rayleigh scattering component calculating unit 307 reads the RGB lower-pixel-value corrected image data from the RGB lower-pixel corrected data storing unit 313, reads the Mie scattering component image from the Mie scattering component data storing unit 314, and reads the input image from the input image data storing unit 204.

In step S1202, the Rayleigh scattering component calculating unit 307 subtracts a pixel value for each pixel in the image, in order to obtain a Rayleigh scattering component image. Specifically, the calculation is performed according to formula (12) below.

When $I(x,y,c)-J_{lower}(x,y,c)-M(x,y,c)>0$:

$$R(x,y,c)=I(x,y,c)-J_{lower}(x,y,c)-M(x,y,c)$$

When $I(x,y,c)-J_{lower}(x,y,c)-M(x,y,c)>0$:

$$R(x,y,c)=0 \quad (12)$$

Here, R(x, y, c) is the Rayleigh scattering component image. The Rayleigh scattering component can be extracted from the image by means of this calculation.

In step S1203, the Rayleigh scattering component calculating unit 307 stores the Rayleigh scattering component image calculated in step S1202 in the Rayleigh scattering component data storing unit 315.

By performing processing as described above, the Rayleigh scattering component in the image can be calculated.

Composing Processing

Next, composing processing (step S507) by the composing unit 308 will be described.

The composing unit 308 calculates a composed image $J_{out}(x, y, c)$ according to formula 13 below.

$$J_{out}(x,y,c)=J_{RGB}(x,y,c)+m \cdot M(x,y,c)+r \cdot R(x,y,c) \quad (13)$$

Here, m is a Mie scattering intensity coefficient, and r is a Rayleigh scattering intensity coefficient. In the present embodiment, it is desirable that the coefficients take a value between zero and one in each of the first and second parameters, but other values may be used as a matter of course.

According to the present invention, when processing for removing the influence of a fine particle component in an image is performed, the effect of the removal processing can be changed based on object detection results, as described above. Accordingly, an image in which objects have higher visibility can be obtained.

For example, if a person is set as a target to be detected (object), an image in which the influence of the fine particle component has been removed and which is specific to the person can be obtained.

Note that the above-described configurations pertaining to the removal of fine particles may be implemented in an image-capturing apparatus typified by a digital camera. For example, the configurations may be implemented as an image-capturing mode to be used for performing image-capturing with a person as a photographic subject in the fog. In this case, it suffices to incorporate the image-capturing unit 111 in FIG. 1 as a part of the configuration of the image processing apparatus 100.

Note that, with regard to the object extraction processing unit 206, the fine particle removal processing unit, etc., among the above-described processing units, processing may be performed using a pre-trained model having been subjected to machine learning, in place of such units. In that case, a plurality of combinations of input data and output data for the processing unit are prepared as learning data, for example. Knowledge is acquired from the plurality of pieces of learning data through machine learning, and a pre-trained model that outputs output data corresponding to input data as a result based on the acquired knowledge is generated. The pre-trained model can be configured by using a neural network model, for example. Furthermore, the pre-trained model performs the processing of the processing unit by operating in cooperation with a CPU, a GPU, etc., as a program for performing processing equivalent to that by the processing unit Note that the above-described pre-trained model may be updated as necessary after predetermined processing is performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-084427, filed Apr. 25, 2019 which is hereby incorporated by reference herein in its entirety.

What is claimed is:

1. An image processing apparatus that processes image data obtained by image capturing performed by an image-capturing unit, the image processing apparatus comprising:
    a processor; and
    a memory storing a program which, read and executed by the processor, causes the processor to function as:
    a first setting unit configured to set a first parameter for performing processing for removing an influence of a fine particle component based on the image data;
    a first image processing unit configured to perform fine particle removal processing based on the first parameter set by the first setting unit;
    a second setting unit configured to set a second parameter differing from the first parameter;
    a second image processing unit configured to perform fine particle removal processing based on the second parameter set by the second setting unit;
    a third setting unit configured to set a region for which the first image processing unit is to be used and a region for which the second image processing unit is to be used; and
    a generation unit configured to generate image data from which an influence of fine particles is removed by applying a result from the first image processing unit and a result from the second image processing unit to the respective regions set by the third setting unit
    wherein the second parameter is a parameter for removing the fine particle component to a further extent compared to the first parameter, and
    the third setting unit includes:
        a detection unit configured to detect an object to be detected from image data obtained from the first image processing unit; and
        a determination unit configured to determine a region in which an object was detected by the detection unit and a region in which no object was detected by the detection unit, and
        sets the region in which no object was detected as a processing target of the second image processing unit.

2. The apparatus according to claim 1, wherein the generation unit generates a composed image by selecting image data obtained by the first image processing unit for the region in which an object was detected determined by the determination unit, and selecting image data obtained by the second image processing unit for the region in which no object was detected determined by the determination unit.

3. The apparatus according to claim 1, further comprising the image-capturing unit.

4. The apparatus according to claim 1,
wherein the first image processing unit and the second image processing unit perform calculation of a Mie scattering component and calculation of a Rayleigh scattering component, and perform the fine particle removal processing by generating a composed image in which the calculated Mie scattering component and the Rayleigh scattering component are used.

5. The apparatus according to claim 4,
wherein the first parameter and the second parameter include a Mie scattering intensity coefficient and a Rayleigh scattering intensity coefficient, the Mie scattering intensity coefficient and the Rayleigh scattering intensity coefficient respectively indicating a contribution of the Mie scattering component and a contribution of the Rayleigh scattering component in the generation of the composed image, and
the Mie scattering intensity coefficient and the Rayleigh scattering intensity coefficient have smaller values in the second parameter than in the first parameter.

6. A method of controlling an image processing apparatus that processes image data obtained by image capturing performed by an image-capturing unit, the method comprising:
a first setting step of setting a first parameter for performing processing for removing an influence of a fine particle component based on the image data;
a first image processing step of performing fine particle removal processing based on the first parameter set in the first setting step;
a second setting step of setting a second parameter differing from the first parameter;
a second image processing step of performing fine particle removal processing based on the second parameter set in the second setting step;
a third setting step of setting a region for which the first image processing step is to be used and a region for which the second image processing step is to be used; and
a generation step of generating image data from which an influence of fine particles is removed by applying a result from the first image processing unit and a result from the second image processing unit to the respective regions set by the setting unit
wherein the second parameter is a parameter for removing the fine particle component to a further extent compared to the first parameter, and
the third setting step includes:
a detection step of detecting an object to be detected from image data obtained from the first image processing step; and
a determination step of determining a region in which an object was detected in the detection step and a region in which no object was detected in the detection step, and
sets the region in which no object was detected as a processing target of the second image processing step.

7. The method according to claim 6,
wherein the generation step generates a composed image by selecting image data obtained in the first image processing step for the region in which an object was detected determined in the determination step, and selecting image data obtained in the second image processing step for the region in which no object was detected determined in the determination step.

8. The method according to claim 6, further comprising capturing an image using the image-capturing unit.

9. The method according to claim 6,
wherein the first image processing step and the second image processing step perform calculation of a Mie scattering component and calculation of a Rayleigh scattering component, and perform the fine particle removal processing by generating a composed image in which the calculated Mie scattering component and the Rayleigh scattering component are used.

10. The method according to claim 9,
wherein the first parameter and the second parameter include a Mie scattering intensity coefficient and a Rayleigh scattering intensity coefficient, the Mie scattering intensity coefficient and the Rayleigh scattering intensity coefficient respectively indicating a contribution of the Mie scattering component and a contribution of the Rayleigh scattering component in the generation of the composed image, and
the Mie scattering intensity coefficient and the Rayleigh scattering intensity coefficient have smaller values in the second parameter than in the first parameter.

11. A non-transitory computer-readable storage medium storing a program executable by a computer to execute a method of controlling an image processing apparatus that processes image data obtained by image capturing performed by an image-capturing unit, the method comprising:
a first setting step of setting a first parameter for performing processing for removing an influence of a fine particle component based on the image data;
a first image processing step of performing fine particle removal processing based on the first parameter set in the first setting step;
a second setting step of setting a second parameter differing from the first parameter;
a second image processing step of performing fine particle removal processing based on the second parameter set in the second setting step;
a third setting step of setting a region for which the first image processing step is to be used and a region for which the second image processing step is to be used; and
a generation step of generating image data from which an influence of fine particles is removed by applying a result from the first image processing unit and a result from the second image processing unit to the respective regions set by the setting unit
wherein the second parameter is a parameter for removing the fine particle component to a further extent compared to the first parameter, and
the third setting step includes:
a detection step of detecting an object to be detected from image data obtained from the first image processing step; and
a determination step of determining a region in which an object was detected in the detection step and a region in which no object was detected in the detection step, and
sets the region in which no object was detected as a processing target of the second image processing step.

12. The medium according to claim 11,
wherein the generation step generates a composed image by selecting image data obtained in the first image processing step for the region in which an object was detected determined in the determination step, and selecting image data obtained in the second image processing step for the region in which no object was detected determined in the determination step.

13. The medium according to claim 11, wherein the method further comprising capturing an image using the image-capturing unit.

14. The medium according to claim 11,
wherein the first image processing step and the second image processing step perform calculation of a Mie scattering component and calculation of a Rayleigh scattering component, and perform the fine particle removal processing by generating a composed image in which the calculated Mie scattering component and the Rayleigh scattering component are used.

15. The medium according to claim 14,
wherein the first parameter and the second parameter include a Mie scattering intensity coefficient and a Rayleigh scattering intensity coefficient, the Mie scattering intensity coefficient and the Rayleigh scattering intensity coefficient respectively indicating a contribution of the Mie scattering component and a contribution of the Rayleigh scattering component in the generation of the composed image, and
the Mie scattering intensity coefficient and the Rayleigh scattering intensity coefficient have smaller values in the second parameter than in the first parameter.

* * * * *